C. JARNAGIN.
Carriage-Seat.
No. 11,864.
Patented Oct. 31, 1854.
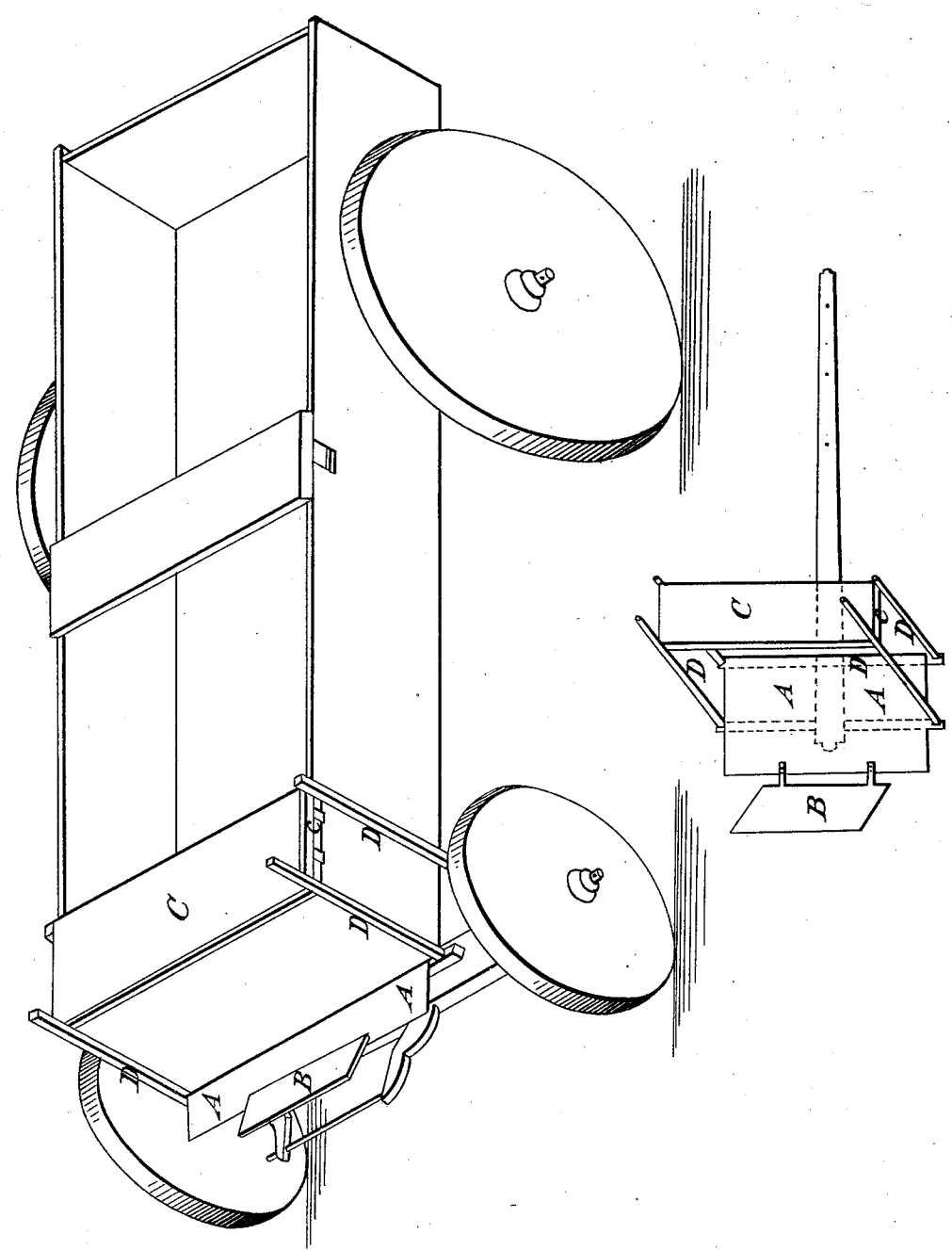

UNITED STATES PATENT OFFICE.

CHESLEY JARNAGIN, OF CLINTON, TENNESSEE.

SEAT FOR WAGONS.

Specification of Letters Patent No. 11,864, dated October 31, 1854.

*To all whom it may concern:*

Be it known that I, CHESLEY JARNAGIN, of Clinton, in the county of Anderson and State of Tennessee, have invented a new and Improved Mode of Making and Attaching to the Running-Gear of Wagons a Safe, Comfortable, and Convenient Seat for Wagon-Drivers; and I do hereby declare that the following is a full and exact description thereof, reference being had to the accompanying drawings and the letters of reference marked thereon.

My invention consists mainly in providing a twofold or double bolster, so placed and arranged that a platform may be securely fastened thereon, as shown at A, and in the ends thereof four standards may be inserted, of any convenient height and at such distance apart as may be desired; these standards answering to the legs of a chair or table and serving as a support to an oblong seat-board, which rests on the cross pieces by which the standards at each end are connected and held together, as shown at letters D and C. The seat is held in place by hooks or clamps fastened to each end and dropping down in contact with the outer sides of the cross pieces on which it rests. A back may be easily attached to it, and cushions, springs, &c., may be used in making it as persons ordering it may fancy and direct. To the platform a footboard is attached, as shown at letter B.

Each part of my contrivance is firmly connected with the rest, while the whole apparatus is securely attached to the running gear of the wagon, and may be used with equal convenience whether the bed or body of the wagon is on the wheels or off.

What I claim as my invention, and desire to secure by Letters Patent is—

The making and attaching to the running gear of wagons of a safe, comfortable and convenient seat for wagon drivers, as herein described.

CHESLEY JARNAGIN.

Witnesses:
BENJN. W. REEDER,
M. H. HOOD.